(12) United States Patent
Novak et al.

(10) Patent No.: US 9,916,677 B2
(45) Date of Patent: Mar. 13, 2018

(54) RAY TRACING ACROSS REFRACTIVE BOUNDARIES

(71) Applicant: Disney Enterprises, Inc., Burbank, CA (US)

(72) Inventors: Jan Novak, Zurich (CH); David Koerner, Stuttgart (DE); Wojciech Jarosz, Zürich (CH); Peter Kutz, Los Angeles, CA (US); Ralf Habel, Toluca Lake, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/220,243

(22) Filed: Jul. 26, 2016

(65) Prior Publication Data

US 2017/0358123 A1 Dec. 14, 2017

Related U.S. Application Data

(60) Provisional application No. 62/348,078, filed on Jun. 9, 2016.

(51) Int. Cl.
| | |
|---|---|
| *G06T 15/06* | (2011.01) |
| *G06T 15/50* | (2011.01) |
| *G06T 7/00* | (2017.01) |
| *G06T 1/20* | (2006.01) |

(52) U.S. Cl.
CPC .............. *G06T 15/06* (2013.01); *G06T 1/20* (2013.01); *G06T 7/0085* (2013.01); *G06T 15/50* (2013.01); *G06T 2200/04* (2013.01); *G06T 2207/20112* (2013.01)

(58) Field of Classification Search
None
See application file for complete search history.

(56) References Cited

U.S. PATENT DOCUMENTS

| | | | |
|---|---|---|---|
| 2014/0267274 A1* | 9/2014 | Burley | G06T 15/506 345/426 |
| 2015/0035831 A1* | 2/2015 | Jarosz | G06T 15/506 345/426 |

OTHER PUBLICATIONS

Holzschuch, Nicolas. "Accurate computation of single scattering in participating media with refractive boundaries." Computer Graphics Forum. vol. 34. No. 6. 2015.*

(Continued)

*Primary Examiner* — Maurice L McDowell, Jr.
*Assistant Examiner* — Donna J Ricks
(74) *Attorney, Agent, or Firm* — Farjami & Farjami LLP

(57) ABSTRACT

According to one exemplary implementation, a method for use by a global illumination system including a hardware processor includes identifying, using the hardware processor, a first interior vertex of multiple first interior vertices of a light path, the first interior vertices being situated within a volume having a refractive boundary. In addition, the method includes determining, using the hardware processor, a surface vertex of the light path at the refractive boundary, and determining, using the hardware processor, a linear direction from the surface vertex to a light source of the light path. The method also includes determining, using the hardware processor, one or more second interior vertices for completing the light path by constructing a path from the surface vertex to the first interior vertex, based on the linear direction, the surface vertex and the first interior vertex.

20 Claims, 11 Drawing Sheets

(56) References Cited

OTHER PUBLICATIONS

Koerner, et al., *Subdivision Next-Event Estimation for Path-Traced Subsurface Scattering*, Eurographics Symposium on Rendering—Experimental Ideas & Implementations (2016).
Hanika, et al., *Manifold Next Event Estimation*, Eurographics Symposium on Rendering (2015).
Walter, et al., *Single Scattering in Refractive Media with Triangle Mesh Boundaries*, ACM SIGGRAPH conference (2009).
Nicolas Holzschuch. *Accurate computation of single scattering in participating media with refractive boundaries*. Computer Graphics Forum, Wiley, 2015, 34 (6), pp. 48-59.
*Bidirectional Path Tracing* pp. 297-330, https://graphics.stanford.edu/courses/cs348b-03/papers/veach-chapter10.pdf.
Georgiev, et al., *Joint Importance Sampling of Low-Order Volumetric Scattering*, ACM TOG 32(6) SIGGRAPH Asia (2013).

\* cited by examiner

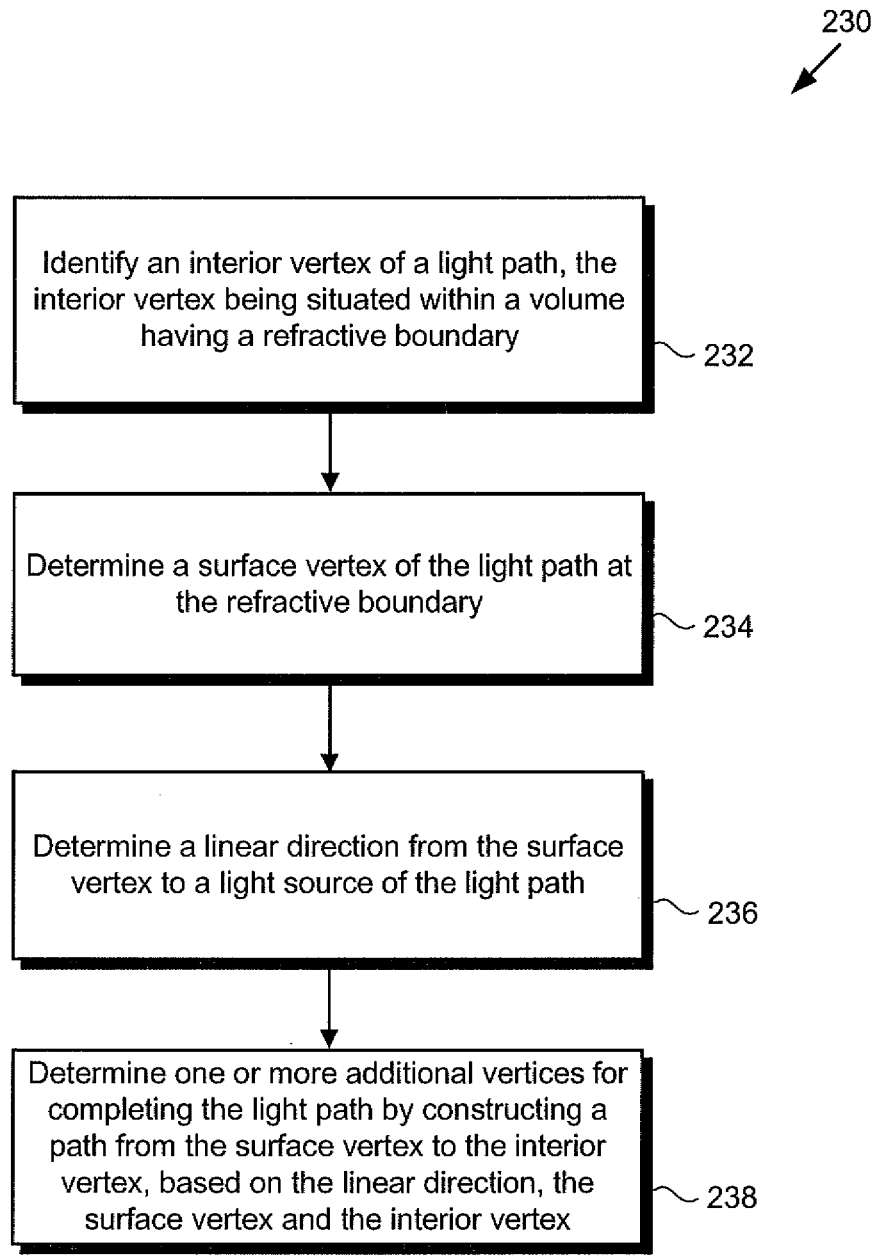

RAY TRACING ACROSS REFRACTIVE BOUNDARIES

RELATED APPLICATIONS

The present application claims the benefit of and priority to Provisional Patent Application Ser. No. 62/348,078, filed Jun. 9, 2016, and titled "Subdivision Next-Event Estimation for Path-Traced Subsurface Scattering," which is hereby incorporated fully by reference into the present application.

BACKGROUND

Next-Event Estimation or "NEE" is a widely used conventional approach to performing ray tracing in the absence of refraction. NEE estimates direct illumination by sampling a light source and testing its visibility by casting a shadow ray. NEE may be performed at each step of light path construction, i.e., at every vertex of a light path, for example.

However, despite its usefulness for estimating direct illumination, NEE is unable to provide accurate estimates for illumination resulting from subsurface scattering of light within a volume enclosed by a refractive boundary. Examples of such volumes include marble statuary, human tissue, milk, and other translucent media. Because NEE connects the light path vertices within a volume enclosed by a refractive boundary with a light source external to the enclosed volume using straight lines through the refractive boundary, the shadow rays utilized by NEE violate Snell's law when crossing the refractive boundary. Thus, a solution enabling ray tracing across refractive boundaries is desirable in order to enhance the accuracy with which illumination caused by subsurface light scattering in translucent media is rendered.

SUMMARY

There are provided systems and methods for performing ray tracing across refractive boundaries, substantially as shown in and/or described in connection with at least one of the figures, and as set forth more completely in the claims.

BRIEF DESCRIPTION OF THE DRAWINGS

FIG. 2 shows a flowchart presenting an exemplary method for performing ray tracing across refractive boundaries, according to one implementation;

DETAILED DESCRIPTION

Figure 1:
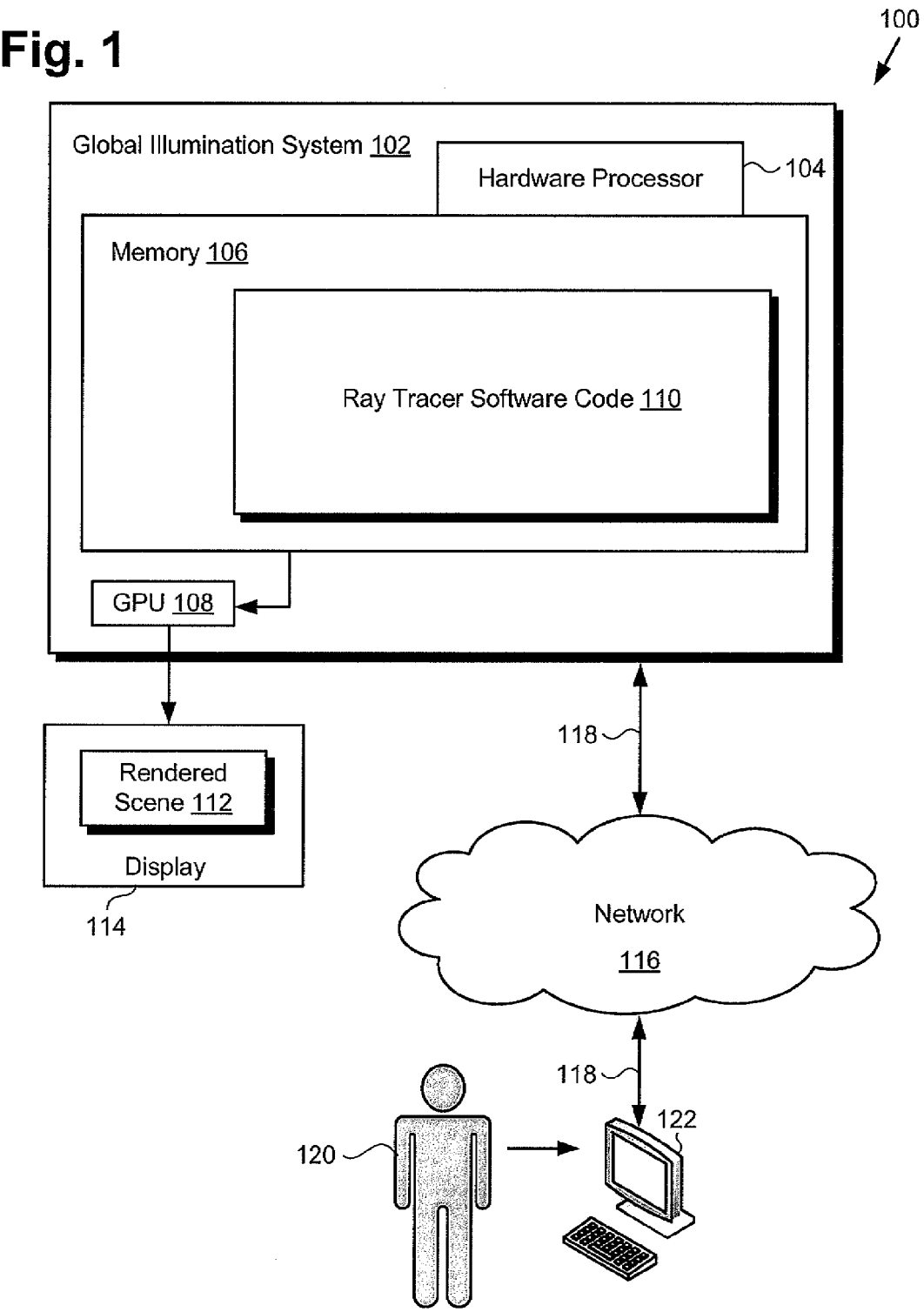
FIG. 1 shows a diagram of an exemplary global illumination system configured to perform ray tracing across refractive boundaries, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of one exemplary implementation of a global illumination system configured to perform ray tracing across refractive boundaries. As shown in FIG. 1, illumination rendering environment 100 includes global illumination system 102, communication network 116, display 114 for providing rendered scene 112, workstation terminal 122, and artist or user 120 utilizing workstation terminal 122. As further shown in FIG. 1, global illumination system 102 includes hardware processor 104, optional graphics processing unit (GPU) 108, and system memory 106 implemented as a non-transitory storage device. According to the present exemplary implementation, system memory stores ray tracer software code 110. Also shown in FIG. 1 are network communication links 118 interactively connecting workstation terminal 122 and global illumination system 102 via communication network 116.

It is noted that although FIG. 1 depicts ray tracer software code 110 as being stored in its entirety in memory 106, that representation is merely provided as an aid to conceptual clarity. More generally, global illumination system 102 may include one or more computing platforms, such as computer servers for example, which may be co-located, or may form an interactively linked but distributed system, such as a cloud based system, for instance. As a result, hardware processor 104 and memory 106 may correspond to distributed processor and memory resources within global illumination system 102. Thus, it is to be understood that ray tracer software code 110 may be stored among the distributed memory resources of global illumination system 102.

According to the implementation shown by FIG. 1, user 120 may utilize workstation terminal 122 to interact with global illumination system 102 over communication network 116. In one such implementation, global illumination system 102 may correspond to one or more web servers, accessible over a packet network such as the Internet, for example. Alternatively, global illumination system 102 may correspond to one or more computer servers supporting a local area network (LAN), or included in another type of limited distribution network. Moreover, in some implementations, communication network 116 may be a high-speed network suitable for high performance computing (HPC), for example a 10 GigE network or an Infiniband network.

Although workstation terminal 122 is shown as a personal computer (PC) in FIG. 1, that representation is also provided merely as an example. In other implementations, workstation terminal 122 may be any other suitable mobile or stationary computing device or system. User 120 may use workstation terminal 122 to operate global illumination system 102, under the control of hardware processor 104 to produce rendered scene 112 on display 114. Display 114 may take the form of a liquid crystal display (LCD), a light-emitting diode (LED) display, an organic light-emitting diode (OLED) display, or another suitable display screen that performs a physical transformation of signals to light.

Figure 4:
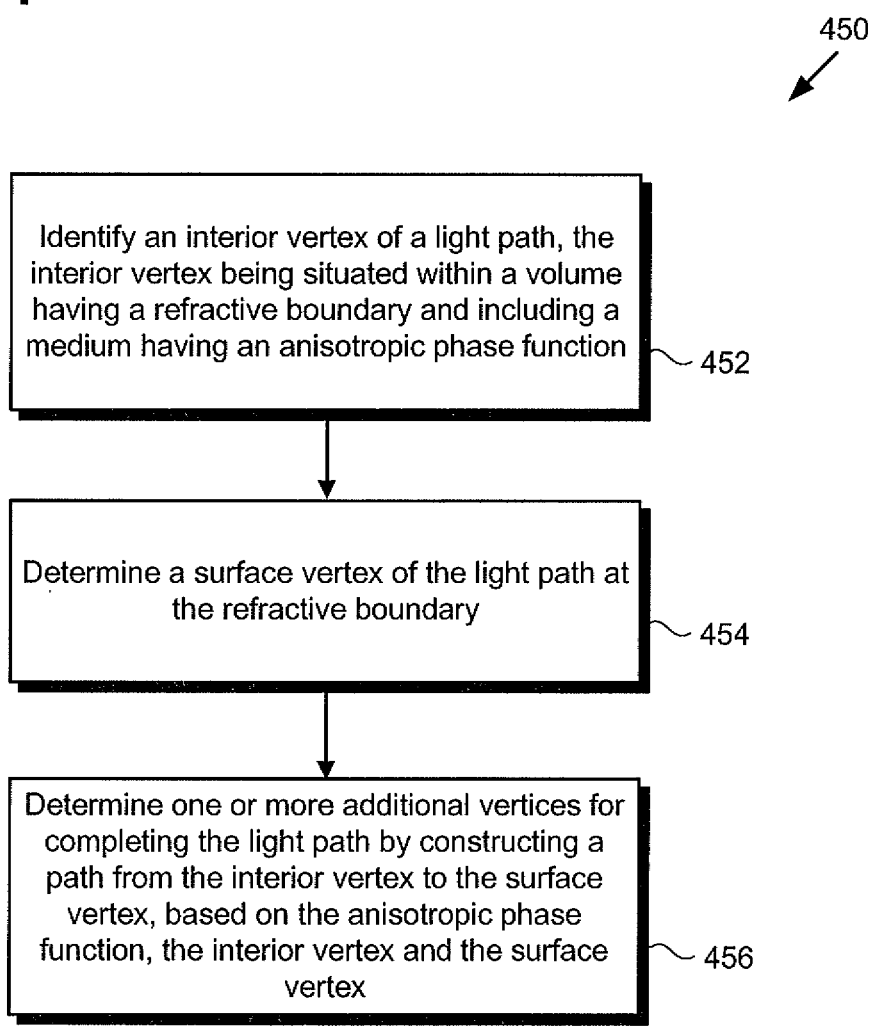
FIG. 4 shows a flowchart presenting an exemplary method for performing ray tracing across refractive boundaries, according to another implementation.
Figure 5A:
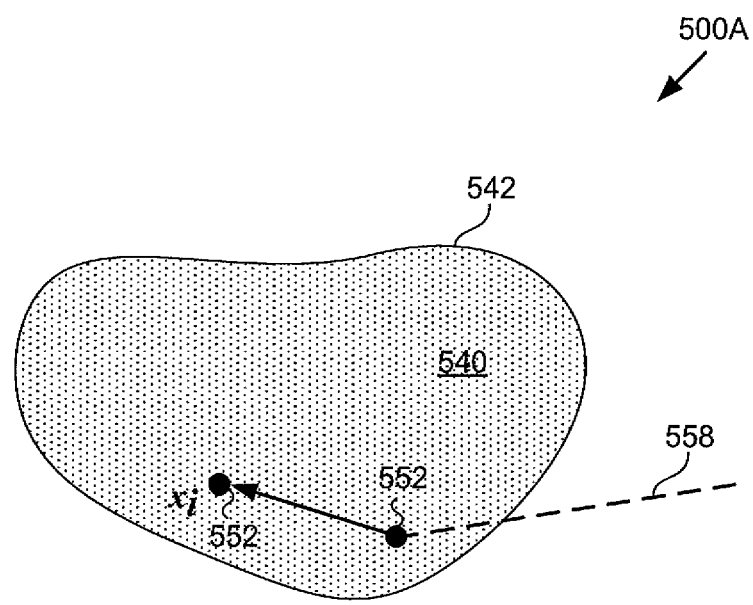
FIG. 5A shows a result of performing an initial action according to the exemplary flowchart of FIG. 4, according to one implementation.
Figure 5B:
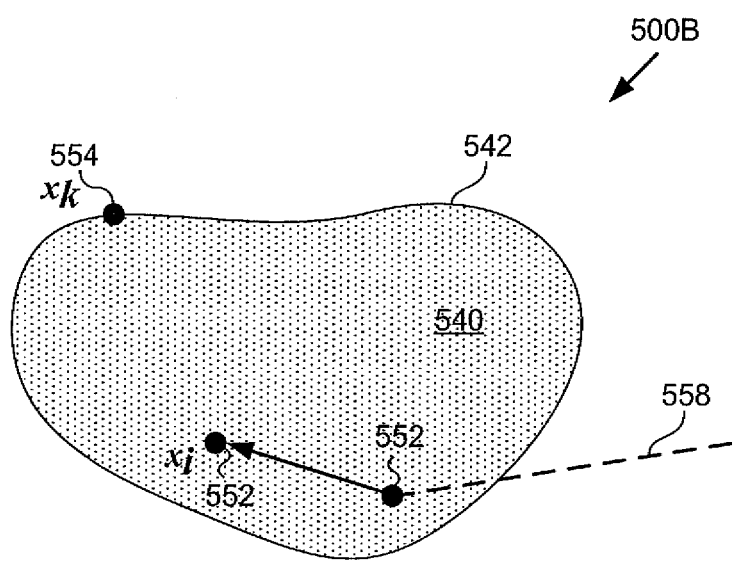
FIG. 5B shows a result of performing a subsequent action according to the exemplary flowchart of FIG. 4, according to one implementation.
Figure 5C:
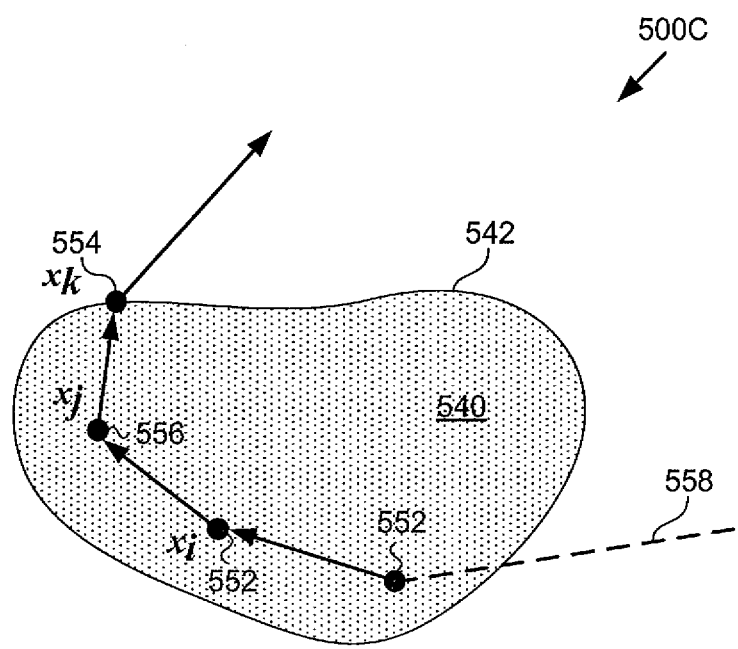
FIG. 5C shows a result of performing a final action according to the exemplary flowchart of FIG. 4, according to one implementation.
Figure 6:
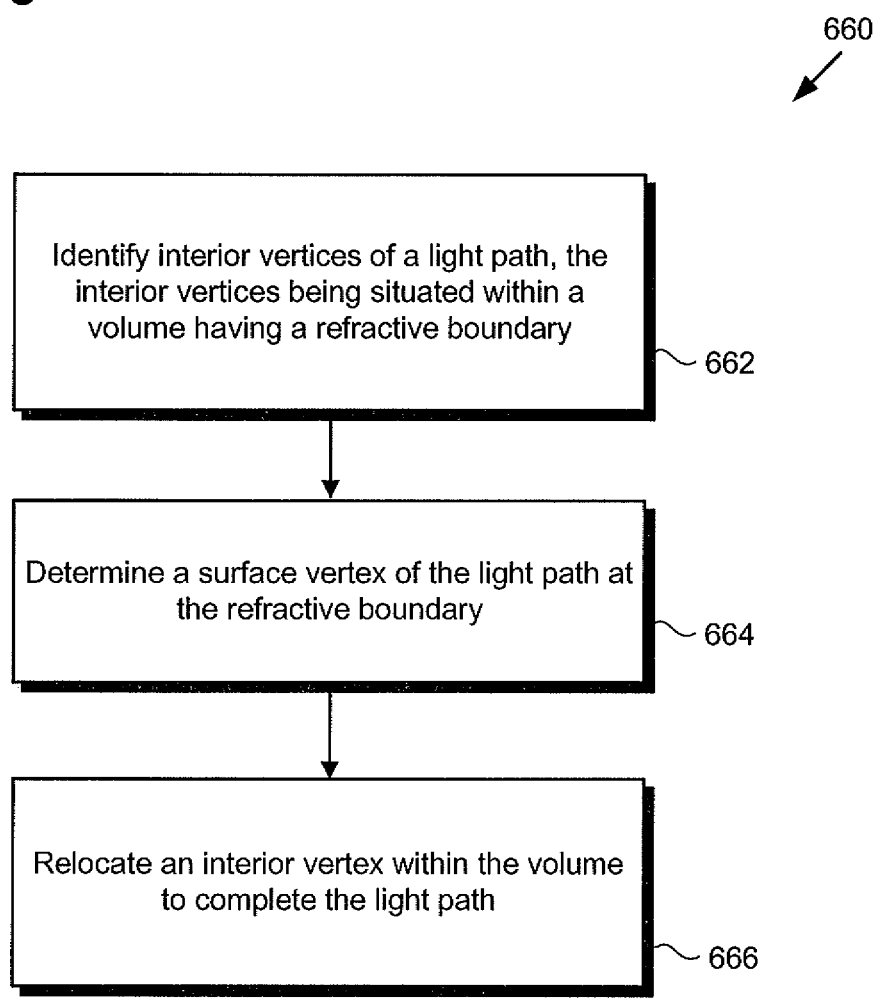
FIG. 6 shows a flowchart presenting an exemplary method for performing ray tracing across refractive boundaries, according to yet another implementation.
Figure 7A:
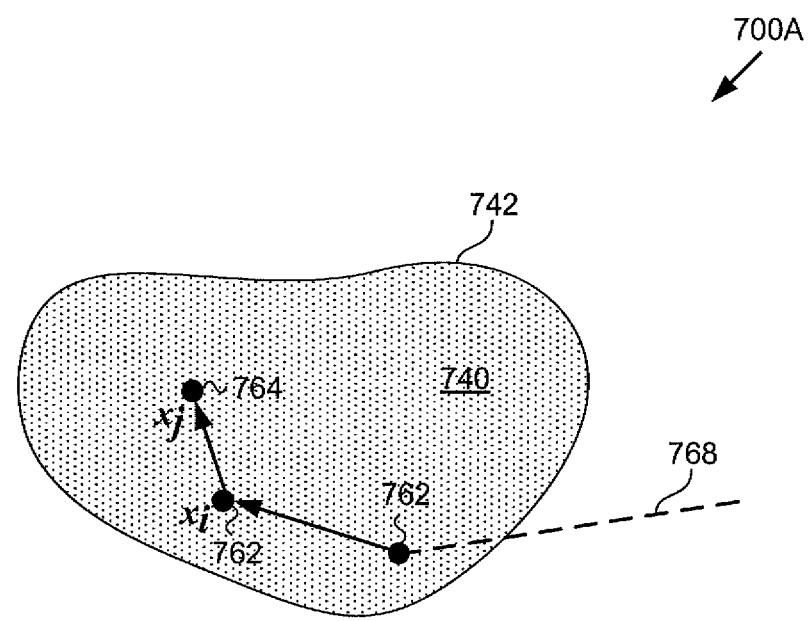
FIG. 7A shows a result of performing an initial action according to the exemplary flowchart of FIG. 6, according to one implementation.
Figure 7B:
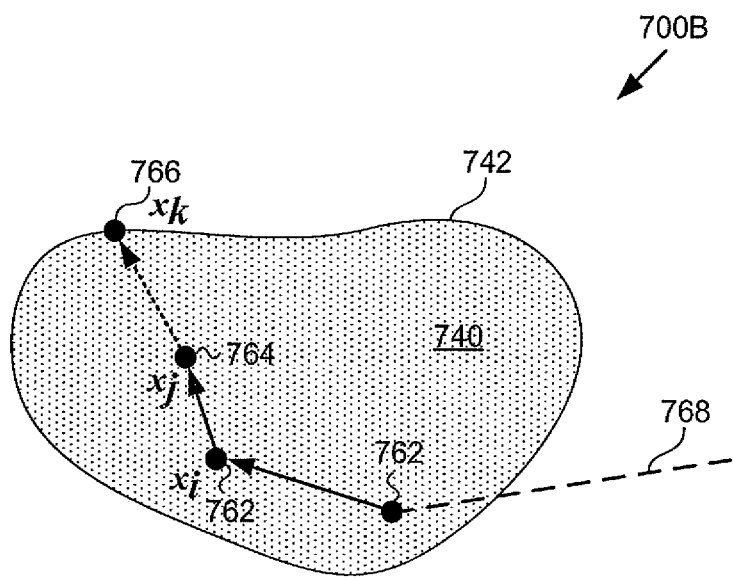
FIG. 7B shows a result of performing a subsequent action according to the exemplary flowchart of FIG. 6, according to one implementation.
Figure 7C:
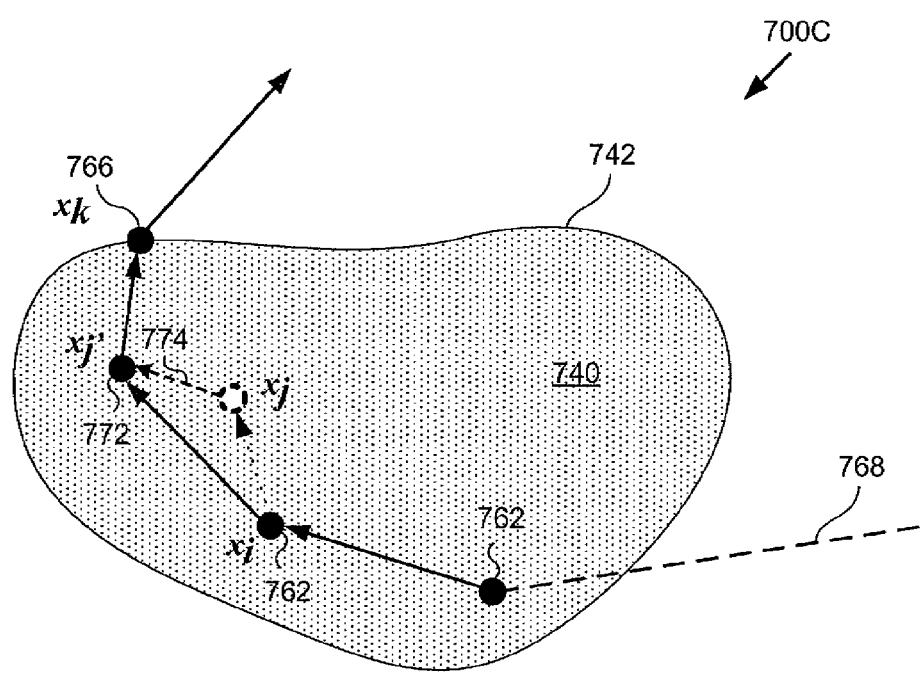
FIG. 7C shows a result of performing a final action according to the exemplary flowchart of FIG. 6, according to one implementation.

The functionality of global illumination system 102 will be further described with reference to FIG. 2, in combination with FIGS. 3A, 3B, 3C, 3D, and 3E, as well as with reference to FIG. 4, in combination with FIGS. 5A, 5B, and 5C, and to FIG. 6, in combination with FIGS. 7A, 7B, and 7C. FIG. 2 shows flowchart 230 presenting an exemplary method for use by a system to perform ray tracing across refractive boundaries, while FIGS. 3A, 3B, 3C, 3D, and 3E show the effects of performing the actions outlined in Flowchart 230, according to one implementation. By analogy, FIG. 4 shows flowchart 450 presenting another exemplary method for use by a system to perform ray tracing across refractive boundaries, while FIGS. 5A, 5B, and 5C show the effects of performing the actions outlined in Flowchart 450, according to one implementation. Similarly, FIG. 6 shows flowchart 660 presenting yet another exemplary method for use by a system to perform ray tracing across refractive boundaries, while FIGS. 7A, 7B, and 7C show the effects of performing the actions outlined in Flowchart 660, according to one implementation.

Figure 3A:
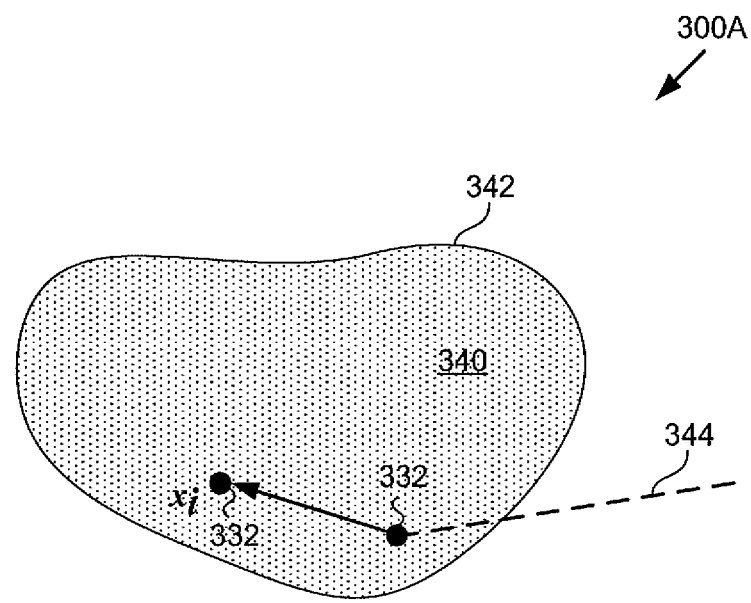
FIG. 3A shows a result of performing an initial action according to the exemplary flowchart of FIG. 2, according to one implementation.

Referring now to FIG. 2 in combination with light path diagram 300A, in FIG. 3A, flowchart 230 begins with identifying first interior vertex $x_i$ of multiple first interior vertices 332 of light path 344 (action 232). Identification of first interior vertex $x_i$ may be performed using hardware processor 104, through execution of ray tracer software code 110. As shown by light path diagram 300A, each of first interior vertices 332 is situated within volume 340 having refractive boundary 342. As further shown by light path diagram 300A, refractive boundary 342 may be a smooth boundary without discontinuities or significant roughness.

According to the implementation shown in FIGS. 3A, 3B, 3C, 3D, and 3E, Volume 340 may include a translucent medium. Examples of such a translucent medium include solid materials, such as marble, gemstones, glass, or flesh; liquids, such as milk or water; and gaseous media, such as dust, smoke, or clouds. Moreover, the translucent medium of volume 340 may cause light passing through volume 340 to undergo any of substantially non-directional, directional, or highly directional subsurface scattering.

Figure 3B:
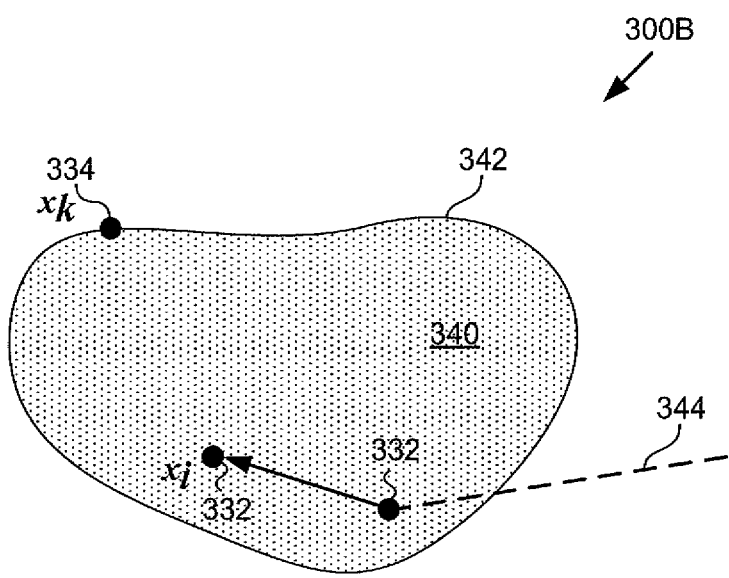
FIG. 3B shows a result of performing a subsequent action according to the exemplary flowchart of FIG. 2, according to one implementation.

Referring to light path diagram 300B, in FIG. 3B, in combination with FIG. 2, flowchart 230 continues with determining surface vertex $x_k$ 334 at refractive boundary 342 (action 234). Surface vertex $x_k$ 334 may be determined using hardware processor 104, through execution of ray tracer software code 110.

Surface vertex $x_k$ 334 may be determined through evaluation of a probability density based on the geometry of the direct connections linking first interior vertex $x_i$ to points on refractive boundary 342. Such a probability density may be expressed as Equation (1):

$$p(x_k \mid x_i) = \frac{c(x_k, x_i)}{\|x_k - x_i\|^2},$$

where $$c(x_k, x_i) = \left| n(x_k) \cdot \frac{x_i - x_k}{\|x_i - x_k\|} \right|,$$

and $n(x_k)$ is the surface normal to refractive boundary 342 at $x_k$. Equation (1) may be evaluated by sampling a random direction within volume 340 and setting $x_k$ to the first intersection with refractive boundary 342.

Figure 3C:
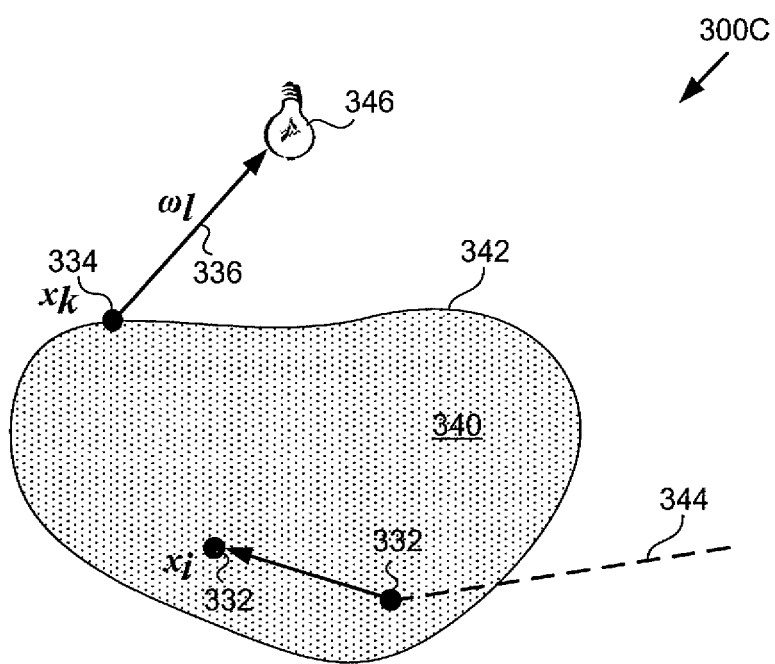
FIG. 3C shows a result of performing a subsequent action according to the exemplary flowchart of FIG. 2, according to one implementation.

Referring to light path diagram 300C, in FIG. 3C, in combination with FIG. 2, in implementations in which light source 346 of light path 344 is a "delta," or highly directional, light source, such as the sun or another emitter approximating a point source of light, flowchart 230 continues with determining linear direction $\omega_l$ 336 from surface vertex $x_k$ 334 to light source 346 (action 236). It is noted that, as used herein, the expression "linear direction $\omega_l$ 336 from surface vertex $x_k$ 334 to light source 346" refers to the direction of a straight line connecting surface vertex $x_k$ 334 to light source 346. Linear direction $\omega_l$ 336 may be determined using hardware processor 104, through execution of ray tracer software code 110.

Figure 3D:
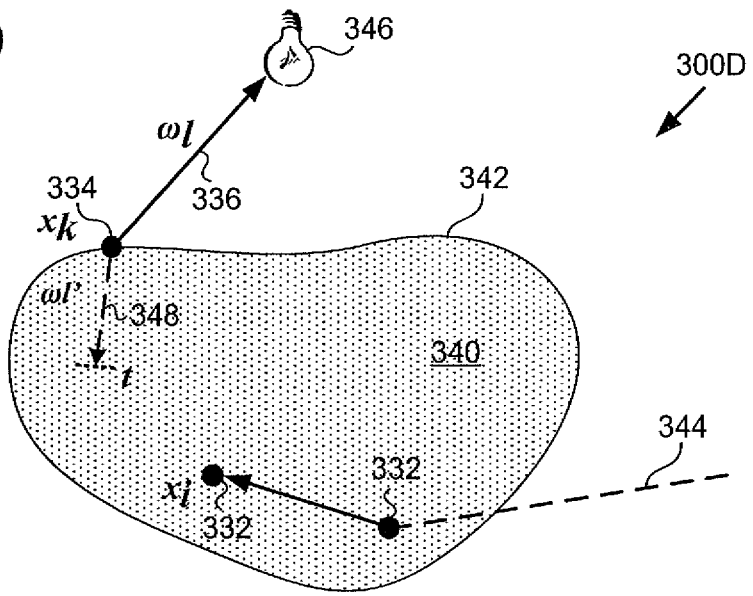
FIGS. 3D and 3E show a result of performing a final action according to the exemplary flowchart of FIG. 2, according to one implementation.
Figure 3E:
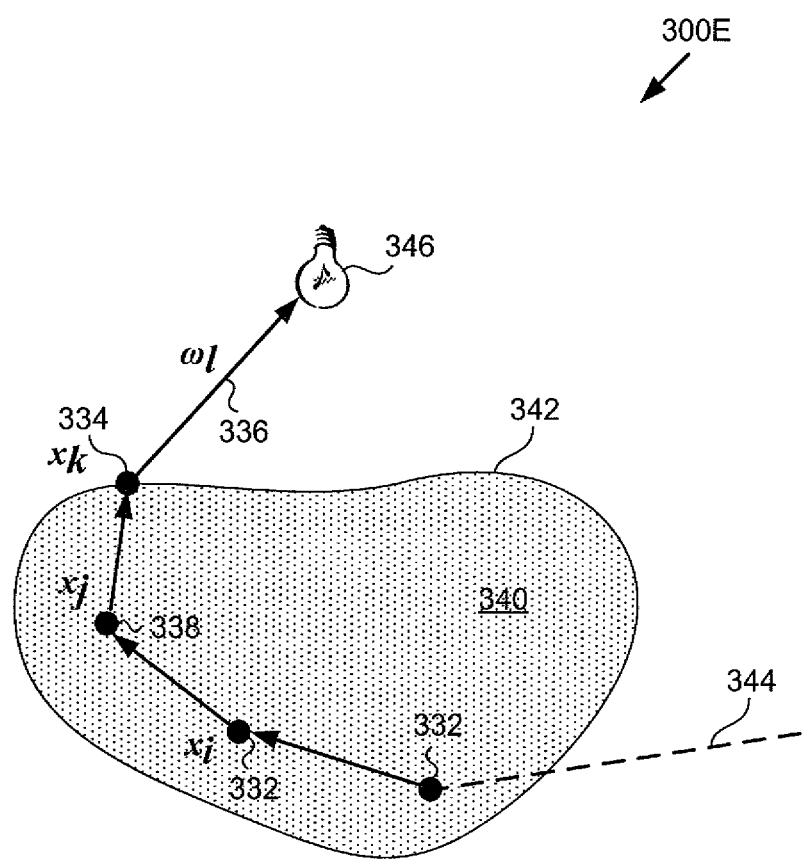

Referring to light path diagrams 300D and 300E, in respective FIGS. 3D and 3E, in combination with FIG. 2, flowchart 230 can conclude with determining one or more second interior vertices $x_j$ 338 for completing light path 344 by constructing a path from surface vertex $x_k$ 334 to first interior vertex $x_i$ (action 238). Determination of one or more second interior vertices $x_j$ 338 may be performed using hardware processor 104, through execution of ray tracer software code 110. It is noted that although FIG. 3E depicts a single second interior vertex $x_j$ 338 completing light path 344 between surface vertex $x_k$ 334 and first interior vertex $x_i$, in other implementations, second interior vertex $x_j$ 338 may correspond to multiple second interior vertices $x_1$ 338 for completing light path 344.

With respect to the exemplary implementation shown by FIGS. 3D and 3E, second interior vertex $x_j$ 338 may be determined by constraining second interior vertex $x_j$ 338 to lie on refracted ray 348 passing through surface vertex $x_k$ 334 and having refracted direction $\omega_j'$ within volume 340. In some implementations, refracted direction may be identified using the bidirectional scattering distribution function (BSDF), as known in the art. Constraining second interior vertex $x_j$ 338 to lie on refracted ray 348 ensures that when light path 344 exits volume 340 at surface vertex $x_k$ 334, light path 344 will substantially satisfy Snell's law across refractive boundary 342.

With first interior vertex $x_i$, surface vertex $x_k$ 334, and refracted direction $\omega_j'$ known, second interior vertex $x_j$ 338 may be determined by sampling the distance t separating second interior vertex $x_j$ 338 from surface vertex $x_k$ 334 along refracted direction $\omega_i'$ using transmittance sampling with density $p_{tr}(t)$ or equiangular sampling $p_{eq}(t)$, and combining both sampling results using multiple importance sampling (MIS). It is noted that each of transmittance sampling, equiangular sampling, and MIS is a well known technique in the art.

The conditional probability density function (PDF) of second interior vertex $x_j$ 338 in view of the constraints discussed above is given by Equation (2):

$$p_{\downarrow}(x_j|x_i,x_k) = p_{light}(\omega_l) p_{bsdf}(\omega_l') \text{MIS}[p_{tr}(t), p_{eq}(t)]$$

It is noted that the PDF of Equation (2) is designated by a downward pointing arrow ($\downarrow$) to emphasize that second interior vertex $x_j$ 338 is determined from surface vertex $x_k$ 334 towards first interior vertex $x_i$. Thus, second interior vertex $x_j$ 338 for completing light path 344 is determined by constructing a path from surface vertex $x_k$ 334 to first interior vertex $x_i$, based on linear direction $\omega_l$ 336, surface vertex $x_k$ 334 and first interior vertex $x_i$.

As stated above by reference to FIG. 3C, the method outlined in flowchart 230 of FIG. 2 may be particularly useful when light source 346 is a highly directional light source. However, the method outlined in flowchart 230 does not consider the affects of directional scattering within volume 340 on light path 344. In implementations in which volume 340 includes a medium having an anisotropic phase function, and the anisotropic phase function of the medium results in highly directional scattering of light within volume 340, another approach, either in lieu of, or in addition to, the method outlined in flowchart 230 may be utilized.

FIG. 4 shows flowchart 450 presenting an exemplary method for performing ray tracing across refractive boundaries, according to another implementation, and suitable for use cases in which the volume enclosed by the refractive boundary includes a medium having an anisotropic phase function. Referring to FIG. 4 in combination with light path diagram 500A, in FIG. 5A, flowchart 450 begins with identifying first interior vertex $x_i$ of multiple first interior vertices 552 of light path 558 (action 452). Identification of first interior vertex $x_i$ may be performed using hardware processor 104, through execution of ray tracer software code 110. As shown by light path diagram 500A, each of first interior vertices 552 is situated within volume 540 having refractive boundary 542.

Volume 540 and refractive boundary 542 correspond respectively in general to volume 340 and refractive boundary 342, in FIGS. 3A, 3B, 3C, 3D, and 3E, and may share any of the characteristics attributed to those corresponding features in the present application. That is to say, volume 540 may include a translucent medium such as marble, gemstone, glass, flesh, milk or water, dust, smoke, or clouds, for example, and/or may cause light passing through volume 540 to undergo any of substantially non-directional, directional, or highly directional subsurface scattering. Moreover, like refractive boundary 342, refractive boundary 542 may be a smooth boundary without discontinuities or significant roughness.

Referring to light path diagram 500B, in FIG. 5B, in combination with FIG. 4, flowchart 450 continues with determining surface vertex $x_k$ 554 at refractive boundary 542 (action 454). Surface vertex $x_k$ 554 may be determined using hardware processor 104, through execution of ray tracer software code 110.

Analogously to the approach taken in the method of flowchart 230 to determine surface vertex $x_k$ 334, surface vertex $x_k$ 554 may be determined through evaluation of Equation (1), i.e.:

$$p(x_k|x_i) = \frac{c(x_k, x_i)}{\|x_k - x_i\|^2},$$

where $$c(x_k, x_i) = \left| n(x_k) \cdot \frac{x_i - x_k}{\|x_i - x_k\|} \right|,$$

and $n(x_k)$ is the surface normal to refractive boundary 542 at $x_k$. Equation (1) may be evaluated by sampling a random direction within volume 540 and setting $x_k$ to the first intersection with refractive boundary 542.

Referring to light path diagram 500C, in FIG. 5C, in combination with FIG. 4, flowchart 450 can conclude with determining one or more second interior vertices $x_j$ 556 for completing light path 558 by constructing a path from first interior vertex $x_i$ to surface vertex $x_k$ 554 and (action 456). Determination of one or more second interior vertices $x_j$ 556 may be performed using hardware processor 104, through execution of ray tracer software code 110. It is noted that although FIG. 5C depicts a single second interior vertex $x_j$ 556 completing light path 558 by constructing a path from first interior vertex $x_i$ to surface vertex $x_k$ 554, in other implementations, second interior vertex $x_j$ 556 may correspond to multiple second interior vertices $x_j$ 556 for completing light path 558.

With first interior vertex $x_i$ and surface vertex $x_k$ 554 known, second interior vertex $x_j$ 556 may be determined by sampling directions $\omega_i$ away from first interior vertex $x_i$, and sampling the distance t separating second interior vertex $x_j$ 556 from first interior vertex $x_i$ in direction $\omega_i$. Direction $\omega_i$ can be sampled using phase function importance sampling $p_{phase}(\omega_i)$ or the $U_2$ joint importance sampling $p_{U2}(\omega_i)$ strategy known in the art. Sampling of distance t can be performed using $p_{tr}(t)$ or $p_{eq}(t)$. The results of sampling direction $\omega_i$ and distance t can then be combined using MIS.

The conditional PDF of second interior vertex $x_j$ 556 in view of the method outlined by flowchart 450 is given by Equation (3):

$$p_{\uparrow}(x_j|x_i,x_k) = \text{MIS}[p_{phase}(\omega_i), p_{u2}(\omega_i)] \text{MIS}[p_{tr}(t), p_{eq}(t)]|$$

It is noted that the PDF of Equation (3) is designated by an upward pointing arrow ($\uparrow$) to emphasize that second interior vertex $x_j$ 556 is determined from first interior vertex $x_i$ towards surface vertex $x_k$ 554. Thus, second interior vertex $x_j$ 556 for completing light path 558 is determined by constructing a path from first interior vertex $x_i$ to surface vertex $x_k$ 554, based on the anisotropic phase function of the medium contained by volume 540, surface vertex $x_k$ 554 and first interior vertex $x_i$.

Determination of second interior vertex $x_j$ 556 enables completion of light path 558 between surface vertex $x_k$ 554 and first interior vertex $x_i$. Moreover, determination of second interior vertex $x_j$ 556 causes light path 558 to substantially satisfy Snell's law across refractive boundary 542.

In some implementations, it may be advantageous or desirable to utilize the methods outlined by flowcharts 230 and 450, in combination, to determine second interior vertex $x_j$ 338/556. In those implementations, MIS may be used to combine the PDFs given by Equation (2) and Equation (3) to provide a composite PDF as Equation (4):

$$p(x_j|x_i,x_k) = \text{MIS}[p_{\downarrow}(x_j|x_i,x_k), p_{\uparrow}(x_j|x_i,x_k)]$$

Once second interior vertex $x_j$ 338/556 is determined using one of Equation (2), Equation (3), or Equation (4), each of first interior vertex $x_i$, second interior vertex $x_j$ 338/556, and direction $\omega_i$ is known. Based on those known values, the incident illumination arriving from direction $\omega_i$ at first interior vertex $x_i$, i.e., $L(x_i, \omega_i)$ can be estimated using Equation (5):

$$L(x_i,\omega_i) = \int_v S_{ij} \int_s f_{ijk} S_{jk} \int_e f_{jkl} S_{jk} L_e(x_l, -\omega_k) dx_l dx_k dx_j,$$

where $v$ and $\mathcal{S}$ are the respective interior volume 340/540 and refractive boundary 342/542, and $\epsilon$ is the union of volume 340/540 and refractive boundary 342/542. The segment throughputs S are defined by Equation (6):

$$S_{ij} = T(x_i, x_j) V(x_i, x_j) \frac{c(x_i, x_j) c(x_j, x_i)}{\|x_i - x_j\|^2},$$

where $T(x_i,x_j)$ and $V(x_i,x_j)$ quantify the respective transmittance and visibility between $x_i$ and $x_j$. It is noted that the fraction in Equation (6) is a geometry term with $c(x_i,x_j)=1$ if $x_i \in v$, and otherwise $$c(x_i, x_j) = \left| n(x_i) \cdot \frac{x_j - x_i}{\|x_j - x_i\|} \right|,$$

where $n(x_i)$ is the surface normal to refractive boundary 342/542 at $x_i$. It is further noted that the vertex throughputs f of Equation (5) are defined by Equation (7):

$$f_{ijk} = \begin{cases} f_p(x_i, x_j, x_k) \sigma_s(x_j), & \text{if } x_j \in V, \\ f_s(x_i, x_j, x_k), & \text{otherwise} \end{cases}$$

Moving now to FIG. 6, FIG. 6 shows flowchart 660 presenting an exemplary method for performing ray tracing across refractive boundaries, according to yet another implementation. Referring to FIG. 6 in combination with light path diagram 700A, in FIG. 7A, flowchart 660 begins with identifying interior vertices of light path 768 including first interior vertices 762 and second interior vertex $x_j$ 764 (action 662). Identification of first interior vertices 762 and second interior vertex $x_j$ 764 may be performed using hardware processor 104, through execution of ray tracer software code 110.

As shown by light path diagram 700A, first interior vertices 762 include first interior vertex $x_i$. As further shown by light path diagram 700A, each of first interior vertices 762 and second interior vertex $x_j$ 764 is situated within volume 740 having refractive boundary 742.

Volume 740 and refractive boundary 742 correspond respectively in general to volume 340 and refractive boundary 342, in FIGS. 3A, 3B, 3C, 3D, and 3E, and may share any of the characteristics attributed to those corresponding features in the present application. That is to say, volume 740 may include a translucent medium such as marble, gemstone, glass, flesh, milk or water, dust, smoke, or clouds, for example, and/or may cause light passing through volume 740 to undergo any of substantially non-directional, directional, or highly directional subsurface scattering. Moreover, like refractive boundary 342, refractive boundary 742 may be a smooth boundary without discontinuities or significant roughness.

Referring to light path diagram 700B, in FIG. 7B, in combination with FIG. 6, flowchart 660 continues with determining surface vertex $x_k$ 766 at refractive boundary 742 (action 664). Surface vertex $x_k$ 766 may be determined using hardware processor 104, through execution of ray tracer software code 110.

In contrast to the approach taken in the methods of flowcharts 230 and 450 to determine respective surface vertices $x_k$ 334 and 554, surface vertex $x_k$ 766 may be determined using conventional forward light path tracing techniques. For example, in one implementation, determination of surface vertex $x_k$ 766 may be performed using Next-Event Estimation (NEE), which is typically utilized to estimate direct illumination in the absence of refraction.

Referring to light path diagram 700C, in FIG. 7C, in combination with FIG. 6, flowchart 660 can conclude with relocating second interior vertex $x_j$ 764 within volume 740 for completing light path 768 between first interior vertices 762 and surface vertex $x_k$ 766 (action 666). Relocation of second interior vertex $x_j$ 764 within volume 740 may be performed using hardware processor 104, through execution of ray tracer software code 110. It is noted that action 666 results in second interior vertex $x_j$ 764 being relocated along path 774 to vertex $x_j'$ 772. Moreover, relocation of second interior vertex $x_j$ 764 to vertex $x_j'$ 772 causes light path 768 including first interior vertices 762, relocated second interior vertex $x_j'$ 772, and surface vertex $x_k$ 766 to substantially satisfy Snell's law across refractive boundary 742.

The PDF for determining relocation of second interior vertex $x_j$ 764 to vertex $x_j'$ 772 can be expressed as Equation (8):

$$p(x_j, x'_j, x_k) = p(x'_j | x_j, x_k) p(x_j, x_k)$$

where $p(x_j, x_k)$ is defined by Equation (9):

$$p(x_j, x_k) = \int_{x_j \in V} p(x_j, x_j, x_k) dx_j$$

Once second interior vertex $x_j$ 764 is relocated to $x_j'$ 772 using Equation (8) and Equation (9) each of first interior vertex $x_i$, relocated second interior vertex $x_j'$ 772, and direction $\omega_i$ from relocated second interior vertex $x_j'$ to first interior vertex $x_i$ is known. Based on those known values, the incident illumination arriving from direction $\omega_i$ at first interior vertex $x_i$, i.e., $L(x_i, \omega_i)$ can be estimated using Equation (5), Equation (6), and Equation (7), as discussed above.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a global illumination system including a hardware processor and a display, the method comprising:

identifying, using the hardware processor, a first interior vertex of a plurality of first interior vertices of a light path, the plurality of first interior vertices being situated within a volume having a refractive boundary;

determining, using the hardware processor, a surface vertex of the light path at the refractive boundary;

determining, using the hardware processor, a linear direction from the surface vertex to a light source of the light path;

determining, using the hardware processor, one or more second interior vertices for completing the light path by constructing a path from the surface vertex to the first interior vertex, based on the linear direction, the surface vertex and the first interior vertex; and rendering, using the hardware processor, a scene on the display based on the one or more second interior vertices.

2. The method of claim 1, wherein the light source comprises a highly directional light source.

3. The method of claim 1, wherein the refractive boundary comprises a smooth boundary.

4. The method of claim 1, wherein the volume comprises a translucent medium.

5. The method of claim 1, wherein the one or more second interior vertices consist of a single second interior vertex.

6. The method of claim 1, wherein the one or more second interior vertices comprise a plurality of second interior vertices.

7. The method of claim 1, wherein the light path substantially satisfies Snell's law across the refractive boundary.

8. A method for use by a global illumination system including a hardware processor and a display, the method comprising:

identifying, using the hardware processor, a first interior vertex of a plurality of first interior vertices of a light path, the plurality of first interior vertices being situated within a volume having a refractive boundary and including a medium having an anisotropic phase function;

determining, using the hardware processor, a surface vertex of the light path at the refractive boundary;

determining, using the hardware processor, one or more second interior vertices for completing the light path by constructing a path from the first interior vertex to the surface vertex, based on the anisotropic phase function, the surface vertex and the first interior vertex: and rendering, using the hardware processor, a scene on the display based on the one or more second interior vertices.

9. The method of claim 8, wherein the anisotropic phase function of the medium results in highly directional scattering of light within the volume.

10. The method of claim 8, wherein the refractive boundary comprises a smooth boundary.

11. The method of claim 8, wherein the volume comprises a translucent medium.

12. The method of claim 8, wherein the one or more second interior vertices consist of a single second interior vertex.

13. The method of claim 8, wherein the one or more second interior vertices comprise a plurality of second interior vertices.

14. The method of claim 8, wherein the light path substantially satisfies Snell's law across the refractive boundary.

15. A method for use by a global illumination system including a hardware processor and a display, the method comprising:

identifying, using the hardware processor, a plurality of first interior vertices and a second interior vertex of a light path, the plurality of first interior vertices and the second interior vertex being situated within a volume having a refractive boundary;

determining, using the hardware processor, a surface vertex of the light path at the refractive boundary;

relocating, using the hardware processor, the second interior vertex within the volume for completing the light path between the plurality of first interior vertices and the surface vertex: and rendering, using the hardware processor, a scene on the display based on the relocated second interior vertex within the volume.

16. The method of claim 15, wherein a light source of the light path comprises a highly directional light source.

17. The method of claim 15, wherein the volume comprises a medium having an anisotropic phase function, and wherein the anisotropic phase function of the medium results in highly directional scattering of light within the volume.

18. The method of claim 15, wherein the refractive boundary comprises a smooth boundary.

19. The method of claim 15, wherein the volume comprises a translucent medium.

20. The method of claim 15, wherein the light path substantially satisfies Snell's law across the refractive boundary.

* * * * *